United States Patent
Barde et al.

(10) Patent No.: US 8,489,847 B2
(45) Date of Patent: Jul. 16, 2013

(54) INTER OPERATING SYSTEM MEMORY HOTSWAP TO SUPPORT MEMORY GROWTH IN A NON-VIRTUALIZED SYSTEM

(75) Inventors: Kaushik Barde, Sunnyvale, CA (US); Gaurav Banga, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 668 days.

(21) Appl. No.: 12/459,963

(22) Filed: Jul. 10, 2009

(65) Prior Publication Data

US 2010/0241821 A1    Sep. 23, 2010

Related U.S. Application Data

(60) Provisional application No. 61/210,578, filed on Mar. 20, 2009.

(51) Int. Cl.
*G06F 12/00* (2006.01)
*G06F 9/00* (2006.01)

(52) U.S. Cl.
USPC .............................. 711/173; 711/206; 713/2

(58) Field of Classification Search
USPC ........................................................ 711/173
See application file for complete search history.

(56) References Cited

U.S. PATENT DOCUMENTS

| | | | | |
|---|---|---|---|---|
| 6,049,854 | A * | 4/2000 | Bedarida ........................ | 711/153 |
| 6,763,458 | B1 * | 7/2004 | Watanabe et al. ............... | 713/100 |
| 8,327,174 | B2 | 12/2012 | Banga | |
| 2001/0018717 | A1 * | 8/2001 | Shimotono .................... | 709/319 |
| 2004/0078562 | A1 * | 4/2004 | Koning et al. ................. | 713/151 |
| 2004/0237086 | A1 * | 11/2004 | Sekiguchi et al. ............. | 718/100 |

(Continued)

FOREIGN PATENT DOCUMENTS

| | | |
|---|---|---|
| EP | 1037133 | 9/2000 |
| GB | 2418751 | 4/2006 |
| WO | WO-2006/088637 | 8/2006 |
| WO | WO-2007/109145 | 9/2007 |

OTHER PUBLICATIONS

International Searching Authority, International Search Report and Written Opinion, Appln No. PCT/US2010/027428, date mailing Jul. 5, 2010, pp. 13.

(Continued)

*Primary Examiner* — Kaushikkumar Patel

(57) ABSTRACT

A system memory is partitioned into a first paged partition for a first operating system and a second paged partition for a second operating system. The first paged partition is mapped into a first virtual memory partition, and the second paged partition is mapped into a second virtual memory partition. A subset of pages within the second virtual memory partition is marked as reclaimable by the first operating system to produce a set of marked pages. Responsive to a request by the first operating system for further memory, at least one reclaimable page selected from the set of marked pages is swapped out to a storage file, and the first operating system writes to the at least one reclaimable page.

22 Claims, 5 Drawing Sheets

U.S. PATENT DOCUMENTS

| | | | |
|---|---|---|---|
| 2005/0182922 A1* | 8/2005 | Guo et al. ........................ | 713/1 |
| 2005/0216722 A1* | 9/2005 | Kim et al. ........................ | 713/2 |
| 2005/0235123 A1* | 10/2005 | Zimmer et al. .................. | 711/170 |
| 2006/0133362 A1* | 6/2006 | Stein et al. ...................... | 370/360 |
| 2007/0005947 A1* | 1/2007 | Chartrand et al. ............... | 713/1 |
| 2007/0055860 A1 | 3/2007 | Wang | |
| 2008/0092145 A1 | 4/2008 | Sun | |
| 2008/0141266 A1* | 6/2008 | Hunt et al. ...................... | 718/106 |
| 2008/0189538 A1 | 8/2008 | King et al. | |
| 2010/0122077 A1* | 5/2010 | Durham .......................... | 713/100 |
| 2010/0241839 A1 | 9/2010 | Banga | |

OTHER PUBLICATIONS

U.S. Appl. No. 12/459,953, Non-Final Rejection dated Nov. 4, 2011, pp. 1-10 and attachments.

Dynamic Resource Management for Hibernation Swapping of PREHibernated OS Image, IBM, IP.com journal, Sep. 29, 2003 (2 pages).

U.S. Appl. No. 12/459,953, Final Rejection dated Jun. 8, 2012, pp. 1-11 and attachments.

* cited by examiner

INTER OPERATING SYSTEM MEMORY HOTSWAP TO SUPPORT MEMORY GROWTH IN A NON-VIRTUALIZED SYSTEM

RELATED APPLICATION

This application claims the benefit of U.S. Provisional Application Ser. No. 61/210,578, filed on Mar. 20, 2009.

FIELD OF THE INVENTION

The present invention generally relates to personal computers and devices sharing similar architectures and, more particularly relates to a system and corresponding method for managing, activating and controlling memory resources in an environment of plural non-virtualized plural operating systems and/or the like within a computing apparatus or within a single computer operational session or context.

BACKGROUND OF THE INVENTION

Modernly, the use of PCs (personal computers), including so-called laptop and notebook computers, is increasingly common and the computers themselves are of increasing computer powerful, decreasing thermal power and ever more complex.

A vast majority of PCs have a controlling software, for example an OS (Operating System) such as Microsoft® Windows® Vista® or a like commercial product. Many varieties of OS are available largely due to the need to make design tradeoffs. In particular, feature richness with attendant complexity and size is traded off against (relatively) limited capabilities with increased speed (especially speed of operation and of load time).

Thus a need has existed to provide for the use of multiple OS within a computer and various approaches, each with its own tradeoffs, have been used.

One approach, disclosed in the U.S. Provisional Application Ser. No. 61/210,578, filed on Mar. 20, 2009 for a patent and which is hereby included by this reference, provided for OS interchange in a non-virtualized environment.

When implementing such a system a need for enhanced memory management exists to avoid or mitigate inflexible partitioning of system memory between OSes.

SUMMARY OF THE INVENTION

The disclosed invention includes, among other things, methods and techniques for providing OS memory recovery assistance in pursuit of the support of multiple OSes (Operating Systems).

The present invention provides a method for operating a computer for data communications and also an apparatus that embodies the method. In addition program products and other means for exploiting the invention are presented.

According to an aspect of the present invention an embodiment of the invention may provide for partitioning system memory into three paged partitions; creating page table(s); making respective memory partitions visible to at least two OSes; marking some pages associated with one OS as usable by the other OS; swapping out pages memory so that pages may be borrowed and reinstated later when a previous context resumes.

An advantage and/or feature provided by or resulting from implementing the present invention is that memory may be redeployed between multiple OSes (typically two OSes but optionally three or more) without need for either a lengthy reboot time or the disadvantages inherent in the use of virtualization techniques. Consequently there is improved use of memory resource is such systems, for example the Hyperspace™ firmware and software product of Phoenix® Technologies Ltd.

BRIEF DESCRIPTION OF THE DRAWINGS

The aforementioned and related advantages and features of the present invention will become better understood and appreciated upon review of the following detailed description of the invention, taken in conjunction with the following drawings, which are incorporated in and constitute a part of the specification, illustrate an embodiment of the invention and wherein like numerals represent like elements, and in which.

DETAILED DESCRIPTION OF THE INVENTION

Figure 1:
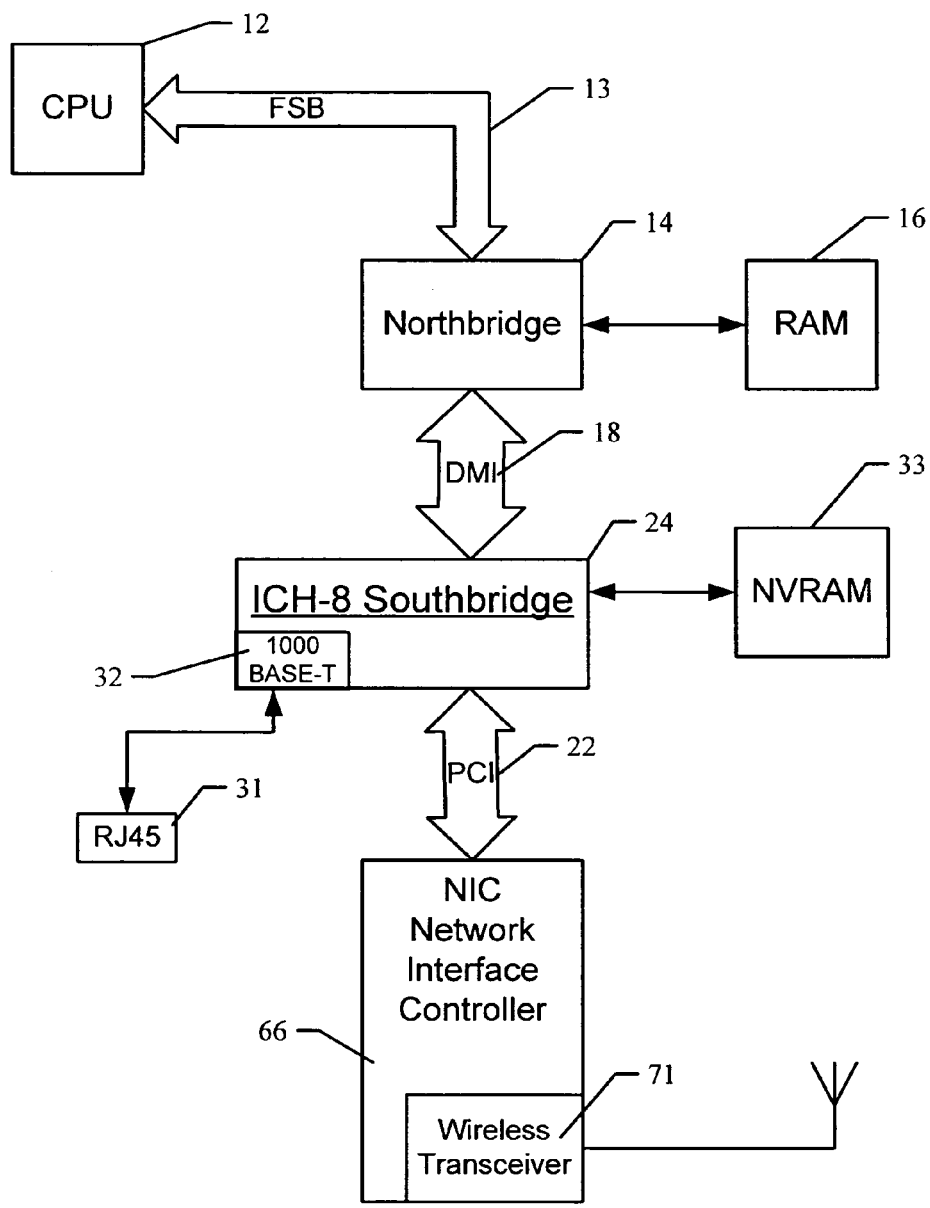
FIG. 1 is a schematic block diagram of an electronic device configured to implement the security functionality according to the present invention.

The numerous components shown in the drawings are presented to provide a person of ordinary skill in the art a thorough, enabling disclosure of the present invention. The description of well known components is not included within this description so as not to obscure the disclosure or take away or otherwise reduce the novelty of the present invention and the main benefits provided thereby.

An exemplary embodiment of the present invention will now be described with reference to the figures. FIG. 1 is a schematic block diagram of an electronic device configured to implement the security functionality according to the present invention.

In an exemplary embodiment, the electronic device 10 may be implemented as a personal computer, for example, a desktop computer, a laptop computer, a tablet PC or other suitable computing device. Although the description outlines the operation of a personal computer, it will be appreciated by those of ordinary skill in the art, that the electronic device 10 may be implemented as a PDA, wireless communication device, for example, a cellular telephone, embedded controllers or devices, for example, set top boxes, printing devices or other suitable devices or combination thereof and suitable for operating or interoperating with the invention.

The electronic device 10 may include at least one processor or CPU (Central Processing Unit) 12, configured to control the overall operation of the electronic device 10. Similar controllers or MPUs (Microprocessor Units) are commonplace. The processor 12 may typically be coupled to a bus controller 14 such as a Northbridge chip by way of a bus 13 such as a FSB (Front-Side Bus). The bus controller 14 may typically provide an interface for read-write system memory 16 such as RAM (random access memory).

In ordinary operation, CPU 12 may fetch computer instructions (also termed computer instruction codes, not shown in FIG. 1) from system memory 16. The CPU may then interpret the fetched computer instructions and operate to interpret the instructions thereby to control operation of the electronic device 10. Such use of CPU, system memory and computer instructions that typically comprise OS (Operating System) codes and other software are well known in the computing arts.

The bus controller 14 may also be coupled to a system bus 18, for example a DMI (Direct Media Interface) in typical Intel® style embodiments. Coupled to the DMI 18 may be a so-called Southbridge chip such as an Intel® ICH8 (Input/Output Controller Hub type 8) chip 24

The Southbridge chip 24, may typically incorporate a first NIC (Network Interface Controller) 32 such as of the 1000 BASE-T type of IEEE 802.3 (Institute of Electrical and Electronics Engineers standard number 802.3) interface connecting to an 8PC8 31 (8 positions, 8 contacts) type of wired network connector. An 8PC8 connector 31 is, colloquially known as an RJ45 port and IEEE 802.3 is colloquially known as Ethernet.

In a typical embodiment, the Southbridge chip 24 may be connected to a PCI (peripheral component interconnect) bus 22 which may in turn be connected to a second NIC 66 which drives a Wireless Transceiver 71. Wireless Transceiver 71 may operate in compliance with IEEE 802.11 or other suitable standards. Wireless Transceiver 71 will typically be coupled to some form of radio antenna 72. Also, typically, Southbridge chip 24 may also be coupled to a NVRAM (non-volatile random-access memory) 33.

Either or both NICs 32 and 66 may convey communications signals that are used to form logical network connections such as to an Internet Service. Indeed a typical computer or similar electronic device 10 may have other interfaces, for example USB (Universal Serial Bus, not shown in FIG. 1) that may in turn connect to (for example) a Bluetooth® transceiver for other modes of communication within the general scope of the invention.

Figure 2:
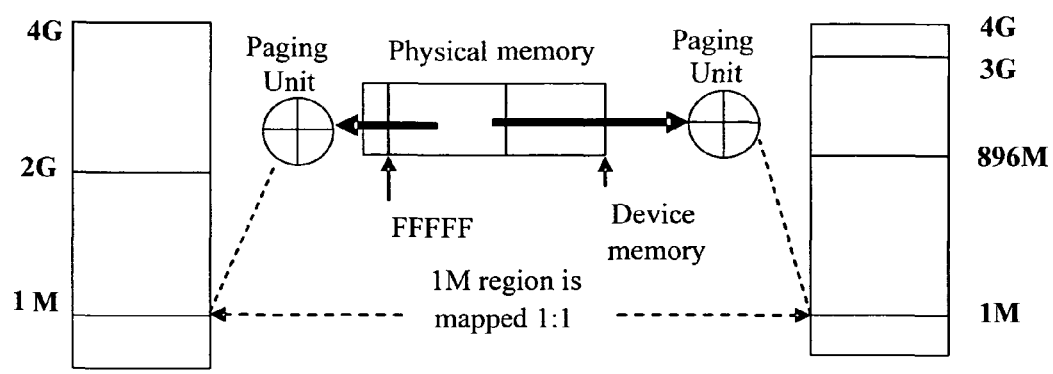
FIG. 2 is a diagram that illustrates memory as manipulated in one particular embodiment of the invention.

FIG. 2 is a diagram that illustrates memory as manipulated in one particular embodiment of the invention. With reference to FIG. 2 now follows a description of necessary changes to Linux® style Virtual Memory Management in X86 processor based computers. Only the needed changes for one particular embodiment is described, the reader is assumed to have ordinary skill in the art of Linux® style Virtual Memory Management software. It should be noted however, that some of the features described are particularly well suited to implementation and distribution in platform firmware since intimated changes of basic hardware controlling entities, such as page tables, in envisaged.

In this implementation described, there is a first OS (operating system) which is Linux®-like in nature and reference to an OS termed "Windows" which is a generic term for any non-open source proprietary OS such as one of the Microsoft® Windows® program products. The understanding is that the "Windows" is a software black-box meaning that if memory resource (whether virtual or physical) is redeployed the only way to have Windows run correctly after such redeployment is to reinstate the memory contents and/or mapping prior to Windows being allowed to execute. Otherwise problems similar to a memory integrity problem are likely to be detects irrespective of whether a false alarm is occurring.

Here then is a description that focuses on the differences in memory management between Linux® and Hyperspace™.

HyperSpace™ is first OS to be booted on system 'cold boot' (ACPI state S5→S0), and based on HyperSpace S5 or S3 trigger, BIOS boots Windows® OS. OSM hooks into BIOS's Int 15—E820 service routine and passes "LAST_BOOT_OS" indicator, such that if its value is HyperSpace, modified memory map (excluding HyperSpace memory) is returned to Windows® and save HyperSpace hardware/memory context. Similar information is saved for Windows® context. This allows BIOS to keep a "S3" context of both HyperSpace and Windows® OS and use it during S3 resume operation for each OS.

HyperSpace boot is described:—HyperSpace is based on Linux® and inherits all of its booting primitives. These primitives not only define how the initial "real mode" OS loading takes place but also how a "protected mode" OS establishes itself as a controlling software from memory management, IO management, and process management aspects. During early boot HyperSpace queries for e820 map to find out information about architecture specific memory characteristics. Return response is disseminated by early boot components to chart out memory in terms of zone boundaries and user/kernel-space spilt. Kernel variables: min_low_pfn, max_low_pfn, max_pfn are values calculated. Difference (max_low_pfn−min_low_pfn) is used to figure out start/end of high memory zone (ZONE_HIGHMEM), max_low_pfn is a highest addressable frame for normal zone (ZONE_NORMAL) and rest memory is treated for dma operations (ZONE_DMA). None of the above characteristics differ with proposed e820h change. However, HyperSpace memory management is altered to be aware of memory occupied by Windows®. This behavior has an impact on its page allocation/de-allocation scheme, but that is an artifact of memory hot-swapping, which is discussed in memory hot-swapping section.

Figure 3:
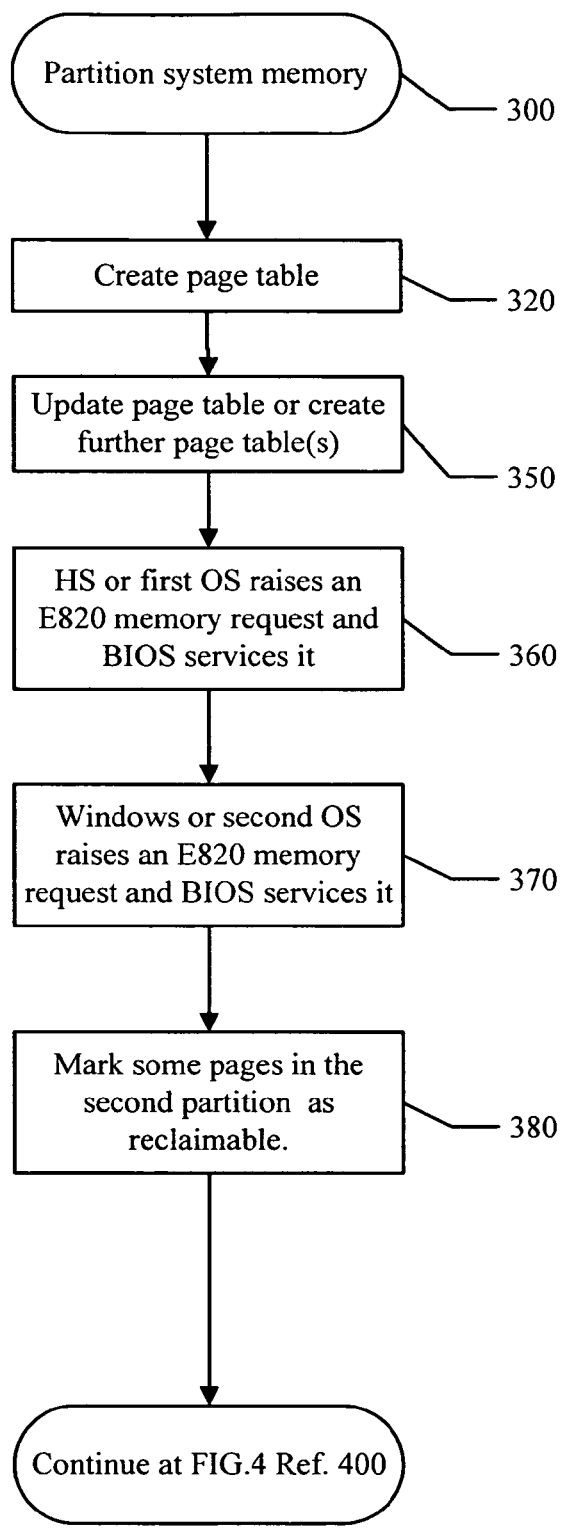
FIGS. 3 and 4, taken together are a somewhat more detailed flowchart illustrating an overview of some of the steps performed in implementing an embodiment of the invention in further detail.

Windows boot in this embodiment of the invention is described. BIOS e820 and OSM changes are transparent to Windows® OS. Memory region occupied by HyperSpace is marked "reserved" (by BIOS) for Windows®. This prevents Windows from mem-mapping this region. Windows® ends up with total memory =(Total Physical Memory—Gfx UMA—BIOS reserved memory—HyperSpace "reserved" memory). FIG. 3 shows typical (non-PAE) physical to virtual memory mapping seen by HyperSpace and Windows® after boot.

Figure 4:
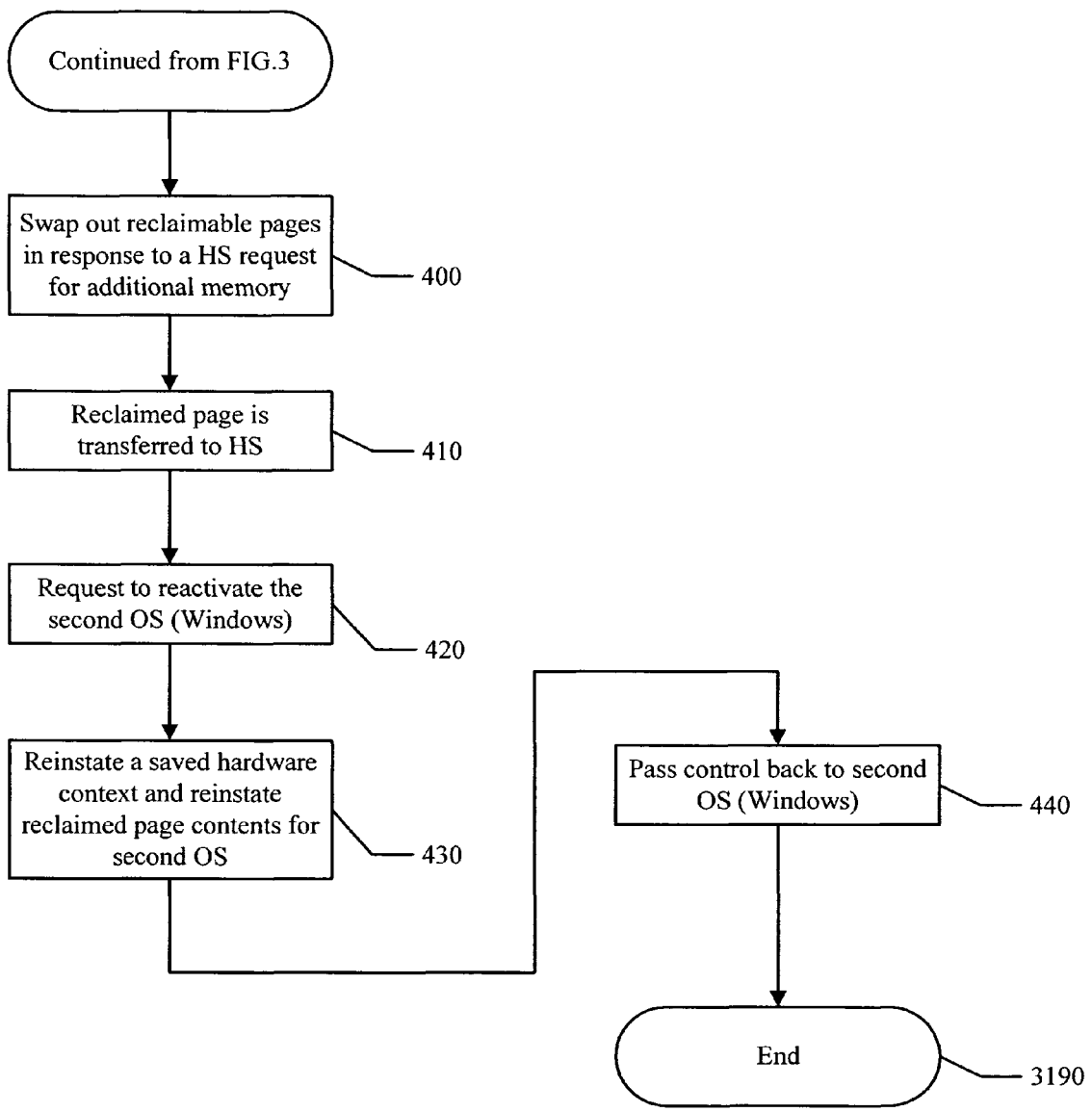

"OS context switch" implementation on HyperSpace system is tied to: OS ACPI "suspend/resume" and BIOS firmware. System BIOS registers with 'SleepTrap' handler code such that S3 suspend writes to PM_CNT1 port is intercepted. This handler code assists OSM to determine if sleep request came from HyperSpace or Windows OS and use this information to 'resume' Windows® OS or HyperSpace. Note, suspend sequence is tied to respective OS ACPI capability. FIG. 4 depicts altered boot/suspend/resume operational flow.

Non-HyperSpace OS can have a HyperSpace software component to facilitate OS context switch. Further, it can be tied to a "keyboard hook-specific key" or "desktop UI" software component.

Keyboard based "suspend" uses a "key" to initiate ACPI S3 state. On Windows® OS, this can be a service or a keyboard filter driver. On HyperSpace OS "suspend" can be controlled through i8042 driver change.

Desktop UI based "suspend" involves programming of a short-cut on Windows® desktop, which will have logic to put Windows® to S3. The 'resume' sequence can be "firmware-controlled" or "hardware-controlled". All resume sequence modes are programmed in OSM module and rely on the fact if both OS's are in ACPI S3 state. "Firmware controlled" resume can be "alternating" or "sequential". "Alternating resume" mode resumes OS other than last suspended OS. "Sequential resume" mode resumes to last suspended OS, which is how current resume operation behaves. This mode effectively turns-off S3 based OS context switching. Hardware-controlled resume mode ties GPIO (General Purpose Input Output) ports to trigger boot and/or resume sequence for HyperSpace and Windows. In resume sequence, the handler passes control to OSM entry point in real mode, which continues with the OS resume . . .

The technique for HyperSpace temporary memory growth using hot-swap memory is described:

On x86-based platforms HyperSpace supports hot-swap memory feature, which allows ranges of physical memory from suspended (S3) Windows® to be added to running (S0) HyperSpace without requiring a system reboot.

HyperSpace support for "hot-swap memory" consists of following changes: Page management and e820 map changes for HyperSpace: System boot into HyperSpace ensures entire "OS usable memory" to be mapped by memory management unit. This memory range includes physical memory reported to Windows® OS. Windows® OS may be suspended (S3) or shutdown (S5) state; if it is suspended then this memory should have a running OS snapshot including device and process memory. HyperSpace memory management unit reads through entire e820 map for the highest page frame. HyperSpace sees entire machine physical memory map, but its memory management is modified to map (memmap( )) pages from HyperSpace "reserved" memory only and leave rest of the memory page-mapped but not-used.

This means change to page frame management such that "reserved" Windows® memory (and associated page frames) is 'initialized but not used' by HyperSpace page management code. This involves following:

Early mm function find_max_pfn( ) sees max_pfn=(Top-x-y)-1M for HyperSpace. Read "real usable physical memory" from OSM/BIOS and store in new variable max_real_pfn.

Add new flag value 'PG_hsusable' to existing "page" structure (defined in <linux/mm.h>). Pages deemed as 'PG_hsusable' or 'PG_skip' will not be used by zone or kernel page table initialization routines. Specifically, functions page_init( ) and free_area_init( ) (mm/page_alloc.c), which set up zones and page descriptors. By default 'PG_reserved' flag is set for all pages during execution of this function.

mem_init( ) (in mm/init_32 and mm/init_64.c) functions need to be modified to use max_real_mfn when resetting "PG_reserved' to zone specific flag (PG_highmem). This ensure all (pages>max_real_mfn) to be 'PG_hsusable'. Note, we considered using 'PG_reserved' value but decided to create new flag value to avoid inter-mixing with existing logic.

Zone watermarks and page swapping to disk: Linux® has three memory zones for managing non-kernel page-table memory: ZONE_DMA, ZONE_NORMAL and ZONE_HIGHMEM. Each zone has three watermarks called pages_low, pages_min and pages_high, which help track how much pressure a zone is under during OS execution. The number of pages for pages_min per zone is calculated in the function free_area_init_core( )during memory initialization and is based on a ratio to the size of the zone in pages. Each watermark warrants different action per Zone. Note that watermarking works in tandem with page-out daemon called 'kswapd'. kswapd is responsible for swapping out pages to/from the disk in an asynchronous manner. Synchronous per zone-page-freeing (referred to as "direct-reclaim") is implemented and used by page allocator.

Memory hot-swap requires following changes to zone and disk swap considerations:

Windows® Memory is "disk saved & swapped" in chunks of 128 MiB and used to extend ZONE_NORMAL, ZONE_HIGHMEM memory and/or any user-configurable chunks of memory.

Zone watermark "reached" detection logic (for all watermarks per zone) needs to account for "PG_hsusable" pages transitioning into per zone free page-pool. This action may warrant a page-table walk to verify "fixed and distributed" pages per zone.

Page allocation (_alloc_pages in mm/page_alloc.c) uses direct-reclaim path using _alloc_pages_internal( ) or kswapd invocation upon low memory condition. It should implement "PG_hsusable" pages transitioning into zone specific "PG_xx" and set additional bitmask "flag=PG-xx|PG_hsinuse" before invoking kswapd or doing kswapd's job manually. Before marking these pages to be used by HyperSpace, it should ensure Windows® paginated memory is written to a "Windows swap" disk file in a page contiguous manner.

Upon HyperSpace suspend (S3), while in protected-mode, and after process "refrigeration", page_allocator should swap the content of "PG_hsinuse" pages onto the HyperSpace "swap" disk file. This file will be read and pages will be "restored" during HyperSpace resume sequence. This ensures re-constructing "memory" as it was before suspend operation.

FIGS. 3 and 4, taken together are a flowchart illustrating an overview of some of the steps performed in implementing one particular embodiment of the invention. In contrast with the fuller description above the flowchart bring out the novelty of the various embodiment of the invention with some focus on the steps involved.

At step 300, system memory is partitioned. A first partition may be set up for HS (Hyperspace™), a second partition for a complex, resource intensive and/or black box non open source OS, such as a Windows® product. A third partition encompasses substantially the entire system memory thus allowing the low level parts of the Hyperspace system to manipulate substantially the entire system memory.

At step 320, a page table is created to map the first paged partition into a first virtual memory partition. Hyperspace OS will typically be loaded into the first partition.

At step 350, either the page table is expanded to incorporate pages for the second OS (typically Windows) or a second page table is created and used. This is a simplification, page tables can be complex, and/or even cascading but this is an implementation detail not critical to the invention.

First OS (typically HS) may be loaded into the first partition and set running. At step 360, BIOS fields an E820 memory request from the first OS (typically HS) this actually enables (for example) HS to see the first partition as its primary memory (available for applications and more), but HS also may see the entire third partition including the second partition.

The second partition is memory set aside primarily for use by a second OS (typically Windows). Second OS may be loaded into the second partition and set running. At step 370, BIOS fields an E820 memory request from the second OS (typically Windows) and makes the second virtual memory partition to the second OS. Second OS (Windows) can be expected to have been loaded into the second partition.

At step 380 some as the pages in the second partition are marked as reclaimable. Typically these are HSusable (usable by HS as reclaimed memory). Some of Windows's pages can be expected to be marked in this way while many or most are not.

At step 400, first OS (HS) makes a request for further memory and reclaimable pages from the first partition are swapped out. Typically this will involve writing the page context and control information to a storage file on a disk. However, technology may change over time and the use of files and disk in swapping may prove not to be crucial. However the memory "owned" by Windows must be swapped out so that it can be reinstated later.

At step 410 the swapped out page is handed over to the first OS which can be expected to write to the page (presumably if HS requests one or more reclaimable memory pages that request arises from an intention to write to the memory involved).

Then, at step 420 there is a request to reactivate the second OS (Windows). To do this, at step 430 there is a reinstating of a saved hardware context, and, from the storage file the reclaimed page contents.

At step 440, control passes to the second OS.

It will be apparent to a programmer of ordinary skill in the art how to extend the above procedure to provide for further extended forms of memory reclamation.

Figure 5:
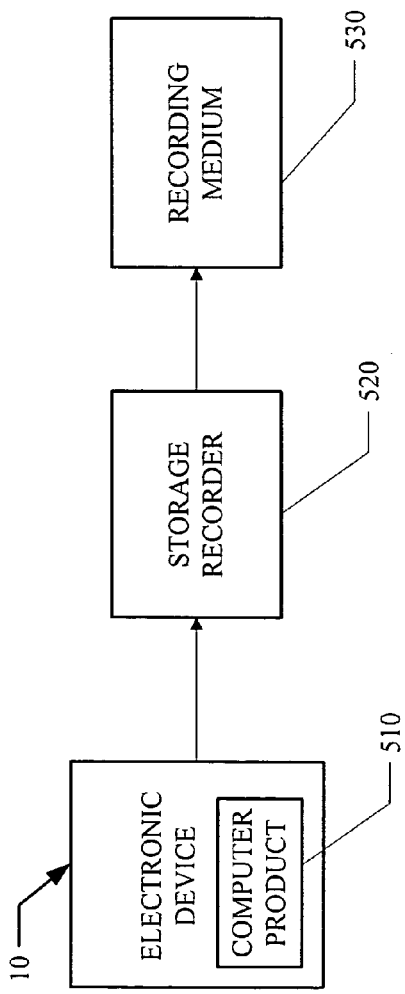
FIG. 5 shows how an exemplary embodiment of the invention may be encoded onto a computer medium or media.

With regards to FIG. 5, computer instructions to be incorporated into an electronic device 10 may be distributed as manufactured firmware and/or software computer products 510 using a variety of possible media 530 having the instructions recorded thereon such as by using a storage recorder 520. Often in products as complex as those that deploy the invention, more than one medium may be used, both in distribution and in manufacturing relevant product. Only one medium is shown in FIG. 5 for clarity but more than one medium may be used and a single computer product may be divided among a plurality of media.

Figure 6:
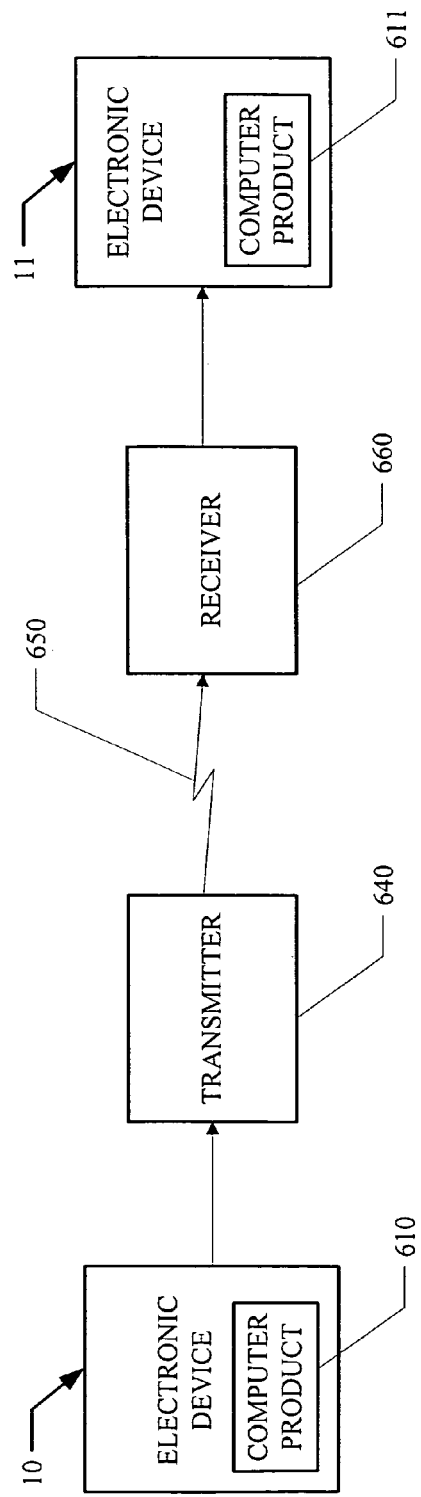
FIG. 6 shows how an exemplary embodiment of the invention may be encoded, transmitted, received and decoded using electromagnetic waves.

FIG. 6 shows how an exemplary embodiment of the invention may be encoded, transmitted, received and decoded using electro-magnetic waves.

With regard to FIG. 6, additionally, and especially since the rise in Internet usage, computer products 610 may be distributed by encoding them into signals modulated as a wave. The resulting waveforms may then be transmitted by a transmitter 640, propagated as tangible modulated electro-magnetic carrier waves 650 and received by a receiver 660. Upon reception they may be demodulated and the signal decoded into a further version or copy of the computer product 611 in a memory or other storage device that is part of a second electronic device 11 and typically similar in nature to electronic device 10.

Other topologies and/or devices could also be used to construct alternative embodiments of the invention. The embodiments described above are exemplary rather than limiting and the bounds of the invention should be determined from the claims. Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method of operating a computer comprising:
    partitioning a system memory comprising a plurality of system memory pages into first, second and third paged partitions wherein the first and the second paged partitions are mutually exclusive and further wherein the first and second paged partitions are subsets of the third paged partition;
    creating a first page table to map the first paged partition into a first virtual memory partition;
    performing an action selected from a group consisting of updating the first page table to map the second paged partition into a second virtual memory partition, and creating a second page table to map the second paged partition into a second virtual memory partition;
    making the first virtual memory partition visible pursuant to a first memory service request from a first OS (operating system) loaded into the first paged partition;
    making the second virtual memory partition visible pursuant to a second memory service request from a second OS loaded into the second paged partition;
    marking a subset of pages within the second virtual memory partition as reclaimable by the first OS to produce a set of marked pages;
    responsive to a request by the first OS for further memory:
        swapping out to a storage file at least one reclaimable page selected from the set of marked pages and writing to the at least one reclaimable page by the first OS;
    responsive to a request to reactivate the second OS, reinstating a saved hardware context, reinstating the at least one reclaimable page from the storage file, and passing control to the second OS.

2. The method of claim 1 wherein:
the first OS is an open source OS and the second OS is a non-open source OS.

3. The method of claim 1 wherein:
the request to reactivate the second OS is an ACPI (Advanced Configuration and Power Interface) System State change request.

4. The method of claim 1 wherein:
the storage file is a disk file.

5. The method of claim 1 wherein:
the first and second memory service requests are E820 requests.

6. The method of claim 1, wherein the first OS and the second OS are different types of operating systems.

7. The method of claim 1, wherein the request by the first OS for further memory is to request adding of portions of memory for use by the first OS.

8. A computer program product comprising:
    at least one non-transitory computer-readable storage medium having instructions encoded therein, the instructions when executed by at least one processor causing said at least one processor to:
    partition a system memory comprising a plurality of system memory pages into first, second and third paged partitions wherein the first and the second paged partitions are mutually exclusive and further wherein the first and second paged partitions are subsets of the third paged partition;
    create a first page table to map the first paged partition into a first virtual memory partition;
    perform an action selected from a group consisting of updating the first page table to map the second paged partition into a second virtual memory partition, and creating a second page table to map the second paged partition into a second virtual memory partition;
    make the first virtual memory partition visible pursuant to a first memory service request from a first OS (operating system);
    make the second virtual memory partition visible pursuant to a second memory service request from a second OS;

mark a subset of pages within the second virtual memory partition as reclaimable by the first OS to produce a set of marked pages;

responsive to a request by the first OS for further memory:
swap out to a storage file at least one reclaimable page selected from the set of marked pages and write to the at least one reclaimable page by the first OS;
responsive to a request to reactivate the second OS, reinstate a saved hardware context, reinstate the at least one reclaimable page from the storage file, and pass control to the second OS.

9. The computer program product of claim 8 wherein:
the request to reactivate the second OS is an ACPI (Advanced Configuration and Power Interface) System State change request.

10. The computer program product of claim 8 wherein:
the storage file is a disk file.

11. The computer program product of claim 8, wherein the first OS and the second OS are different types of operating systems.

12. The computer program product of claim 8, wherein the request by the first OS for further memory is to request adding of portions of memory for use by the first OS.

13. The computer program product of claim 8, wherein the first OS is loaded into the first paged partition, and the second OS is loaded into the second paged partition.

14. An electronic device comprising:
a controller; and
a computer-readable storage medium having instructions encoded therein, the instructions when executed by the controller causing said controller to:
partition a system memory comprising a plurality of system memory pages into a first paged partition for a first operating system (OS), and a second paged partition for a second OS;
map the first paged partition into a first virtual memory partition;
map the second paged partition into a second virtual memory partition;
mark a subset of pages within the second virtual memory partition as reclaimable by the first OS to produce a set of marked pages;
responsive to a request by the first OS for further memory:
swap out to a storage file at least one reclaimable page selected from the set of marked pages and write to the at least one reclaimable page by the first OS;
responsive to a request to reactivate the second OS, reinstate a saved hardware context, reinstate the at least one reclaimable page from the storage file, and pass control to the second OS.

15. The electronic device of claim 14, wherein the first OS and the second OS are different types of operating systems.

16. The electronic device of claim 14, wherein the request by the first OS for further memory is to request adding of portions of memory for use by the first OS.

17. The electronic device of claim 14, wherein the first OS is loaded into the first paged partition, and the second OS is loaded into the second paged partition.

18. A computer program product comprising:
at least one non-transitory computer-readable storage medium having instructions encoded therein, the instructions when executed by at least one processor causing said at least one processor to:
partition a system memory comprising a plurality of system memory pages into a first paged partition for a first operating system (OS), and a second paged partition for a second OS;
map the first paged partition into a first virtual memory partition;
map the second paged partition into a second virtual memory partition;
mark a subset of pages within the second virtual memory partition as reclaimable by the first OS to produce a set of marked pages;
responsive to a request by the first OS for further memory:
swap out to a storage file at least one reclaimable page selected from the set of marked pages and write to the at least one reclaimable page by the first OS;
responsive to a request to reactivate the second OS, reinstate a saved hardware context, reinstate the at least one reclaimable page from the storage file, and pass control to the second OS.

19. The computer program product of claim 18, wherein the first OS and the second OS are different types of operating systems.

20. The computer program product of claim 18, wherein the request by the first OS for further memory is to request adding of portions of memory for use by the first OS.

21. The computer program product of claim 18, wherein the first paged partition is mutually exclusive of the second paged partition.

22. The computer program product of claim 18, wherein the first OS is loaded into the first paged partition, and the second OS is loaded into the second paged partition.

* * * * *